United States Patent [19]
Britnell

[11] 3,782,779
[45] Jan. 1, 1974

[54] WHEEL ASSEMBLY AND METHOD OF MANUFACTURE

[75] Inventor: Douglas A. Britnell, Peterborough, Ontario, Canada

[73] Assignee: Outboard Marine Corporation, Waukegan, Ill.

[22] Filed: Apr. 6, 1972

[21] Appl. No.: 241,589

[52] U.S. Cl............................. 301/63 PW, 308/190
[51] Int. Cl............................................. B60b 5/02
[58] Field of Search................. 301/63 PW, 63 DD; 152/323, 379; 308/190, 191; 29/159 R, 159.01, 159.1

[56] References Cited
UNITED STATES PATENTS

| | | | |
|---|---|---|---|
| 2,730,222 | 1/1956 | Klein............................. | 301/63 PW |
| 2,742,663 | 4/1956 | Meadows....................... | 301/63 PW |
| 2,955,884 | 10/1960 | Marshall........................ | 301/63 PW |
| 3,640,584 | 2/1972 | Solomon........................ | 301/63 PW |
| 3,666,322 | 5/1972 | Pickron......................... | 301/63 PW |
| 1,793,294 | 2/1931 | Vigne............................. | 308/190 |
| 1,882,480 | 10/1932 | Brueshaber.................... | 308/190 |

FOREIGN PATENTS OR APPLICATIONS

| | | | |
|---|---|---|---|
| 464,381 | 4/1937 | Great Britain............. | 301/63 PW |

*Primary Examiner*—Richard J. Johnson
*Assistant Examiner*—Reinhard J. Eisenzopf
*Attorney*—Robert E. Clemency et al.

[57] ABSTRACT

Disclosed herein is a wheel assembly including a flange portion extending integrally from one end of a sleeve and radially inwardly of the outer periphery of a bearing in the sleeve so as to prevent axial movement of the bearing outwardly of the sleeve from the one end thereof, together with a deformed portion extending integrally from the other end of the sleeve and radially inwardly of the outer periphery of a washer or spacer located in the sleeve in adjacent relation to the bearing so as to prevent axial movement of the washer and of the bearing outwardly of the sleeve from the other end thereof.

Also disclosed herein is a method of manufacturing a wheel assembly comprising the steps of forming a bearing sleeve with an outer surface, with a radially inwardly extending flange portion at one end, and with a projecting deformable portion at the other end, bonding to the outer surface of the sleeve a rubber-like wheel, inserting a bearing into the sleeve through the projecting portion and into adjacent relation to the flange portion, subsequently inserting an annular spacer into the sleeve through the projecting portion and into adjacent relation to the bearing, and then deforming the projecting portion inwardly into at least partially overlying relation to the adjacent side of the spacer to permanently retain the bearing and spacer within the sleeve.

5 Claims, 3 Drawing Figures

WHEEL ASSEMBLY AND METHOD OF MANUFACTURE

BACKGROUND OF THE INVENTION

The invention relates generally to wheel assemblies and more particularly to bogie wheel assemblies for vehicles such as, for instance, snowmobiles. The invention also relates to methods of making wheel assemblies such as bogie wheels. In the past, various arrangements have been employed in the manufacture of bogie and other wheels. In one construction, a rubber wheel was fitted onto a bearing retainer through employment of interlocking configuration on the outer periphery of the bearing retainer and the inner periphery of the wheel. In addition, the retainer included a flange to retain a bearing against axial movement in one direction and, in addition, at the other side of the bearing, the retainer included an annular recess affording receipt of a snap ring which interfered with movement of the bearing out of the retainer in the opposite direction.

Another form of prior construction is disclosed in U.S. Pat. No. 3,592,511 issued July 13, 1971.

SUMMARY OF THE INVENTION

The invention provides a wheel assembly which is of especially simple construction and which is accordingly very economical to produce. More specifically, in accordance with the invention, there is provided a wheel assembly in which a rubber or rubber-like wheel is bonded in the manufacturing process to the outer wall of the tubular sleeve and in which a bearing is retained in the tubular sleeve by reason of a flange portion which extends integrally from one end of the sleeve inwardly of the outer periphery of the bearing and by reason of a deformed sleeve portion at the other end thereof, which portion is deformed inwardly of the outer periphery of a washer or spacer located within the sleeve in axial adjacent relation to the bearing on the side thereof remote from the flange portion.

In accordance with the method of the invention, the bearing sleeve is first machined to include an outer surface which is preferably cylindrical and to include at one end thereof, an inwardly extending flange, and at the other end thereof, an axially extending deformable portion. A rubber or rubber-like wheel is then molded onto or bonded to the outer cylindrical surface of the bearing. A bearing is then inserted into the sleeve from the other end followed by insertion of a spacer or washer. The axially extending deformable portion is then deformed or "crimped" or "staked" over the adjacent side of the spacer to positively retain the spacer and bearing in the sleeve.

The wheel assembly provided by the invention is particularly economical to manufacture and will provide reliable service. In addition, a wheel assembly in accordance with the invention is particularly light in weight and provides effective impact cushioning of both the bearing retained therein and the machine or device supported by the wheel assembly. Other advantages of the invention will become known by reference to the following description and the accompanying drawings.

DRAWINGS

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Figure 1:
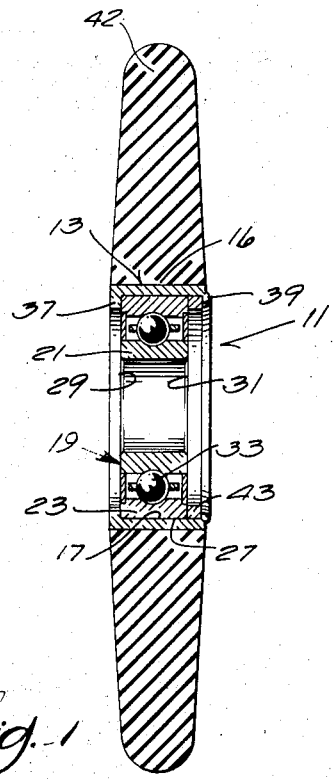
FIG. 1 is a sectional view of a wheel assembly embodying various of the features of the invention.
Figure 2:
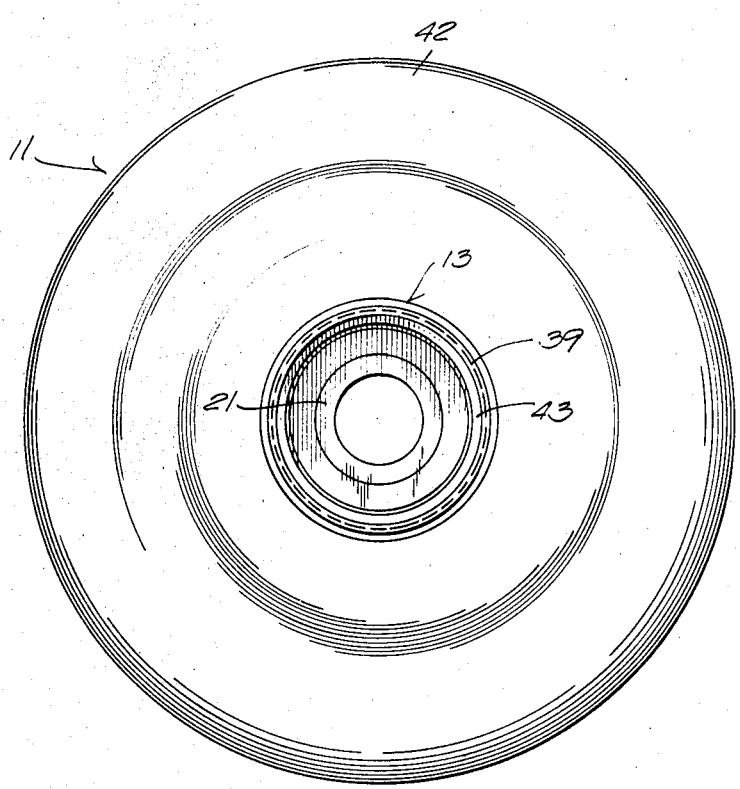
FIG. 2 is a side elevational view of the wheel assembly shown in FIG. 1.

Shown in FIGS. 1 and 2 of the drawings is a wheel assembly 11 which embodies various of the features of the invention and which includes a tubular bearing sleeve 13 including an outer generally cylindrical surface 16 and an inner surface 17 which forms a seat for a bearing 19. While various bearing constructions can be employed, in the illustrated construction, the bearing 19 is preferably pre-assembled and includes an inner race 21 and an outer race 23 with an outer or peripheral surface 27 and axially spaced side walls 29 and 31. As is conventional, a series of balls or rollers 33 are contained between the inner and outer races 21 and 23.

The tubular sleeve 13, includes, at one end, a radially inwardly extending flange or flange portion 37 which projects sufficiently radially inwardly beyond the outer surface 27 of the bearing outer race 23 so as to partially overlie the adjacent sidewall 29 of the outer race 23 and to thereby prevent movement of the bearing 19 in the axial direction past the flange 37 and out of the sleeve 13. While other arrangements are possible, in the illustrated construction, the flange 37 is in the form of a continuously extending collar or shoulder.

Figure 3:
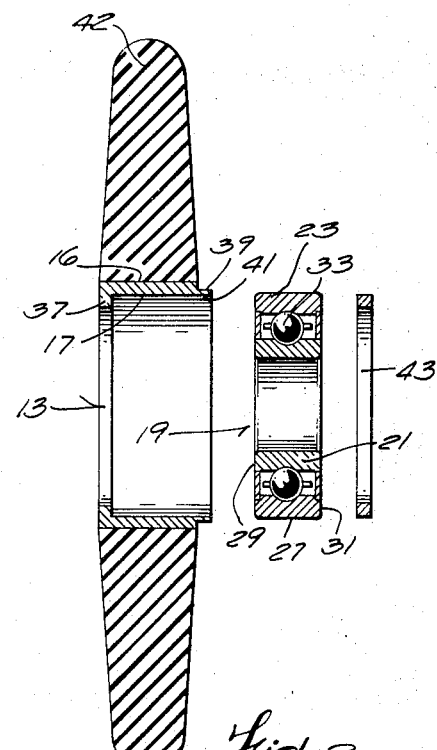
FIG. 3 is an exploded view illustrating various of the components prior to assembly.

At its other end, the tubular sleeve 13 is initially provided (See FIG. 3) with a projecting portion 39 which extends axially and which includes an inner surface 41 constituting an extension of the inner surface 17 and which is deformable.

Bonded to the outer surface 16 of the tubular sleeve is a rubber or rubber-like wheel 42.

Located within the tubular sleeve 13 adjacent to the sidewall 31 of the bearing 19 is a spacer or washer 43 having an outer diameter corresponding generally to the outer surface 27 of the bearing 19 and which is preferably split so as to facilitate insertion of the spacer into the tubular sleeve 13 and to avoid binding in the final assembly step.

After insertion of the spacer or washer 43 into the tubular sleeve and into adjacent relation to the bearing 19, the wheel assembly 11, as thus far assembled, is placed on an anvil (not shown) and the extending portion 39 which projects outwardly is deformed by "staking" or "crimping" or otherwise so that the metal flows radially inwardly beyond the outer periphery of the spacer 43 and into overlying relation to the adjacent side of the spacer 43 to prevent axial movement of the spacer 43 and of the bearing 19 outwardly of the tubular sleeve 13 past the now deformed portion 39.

In accordance with one embodiment of the method of the invention, the tubular sleeve 13 and washer or spacer 43 are separately manufactured through suitable processes from ferrous material, such as steel. In addition, the bearing 19 is pre-assembled. The tubular sleeve 13 is then placed in a compression mold together with a rubber or rubber-like preform. The mold is then closed and heated to produce the final shape of the wheel and to bond the rubber or rubber-like material to the outer surface 16 of the tubular sleeve 13. The bearing 19 and spacer 43 are then inserted in the tubular sleeve 13 and the projecting deformable portion 39 of the tubular sleeve 13 is "staked", "crimped", or otherwise deformed into at least partially overlying relation to the adjacent side of the spacer 43 to permanently retain the wheel assembly components in assembled relation.

There is thus provided an efficient manufacturing method which produces a very desirable wheel assembly at an economical cost.

Various features of the invention are set forth in the following claims.

What is claimed is:

1. A wheel assembly comprising a metalic tubular sleeve having an outer surface, a wheel of rubber or rubber-like material bonded to said outer surface, a bearing located within said sleeve, a flange portion extending integrally from one end of said sleeve inwardly of the outer periphery of said bearing so as to prevent axial movement of said bearing outwardly of said sleeve from said one end thereof, a washer in said sleeve in adjacent relation to said bearing on the side thereof axially remote from said flange portion, and a deformed portion extending integrally from the other end of said sleeve inwardly of the outer periphery of said washer so as to prevent axial movement of said washer and of said bearing outwardly of said sleeve from said other end thereof.

2. A wheel assembly in accordance with claim 1 wherein said outer surface of said tubular sleeve is generally cyindrical.

3. A wheel assembly in accordance with claim 1 wherein said washer is a split ring.

4. A method of manufacturing a wheel assembly comprising the steps of forming a metalic tubular bearing sleeve with an outer surface, and with a radially inwardly extending flange portion at one end, and with a projecting deformable portion at the other end, bonding to the outer surface of the sleeve a rubber or rubber-like wheel, inserting a bearing into the sleeve through the projecting portion and into adjacent relation to the flange portion, subsequently inserting an annular spacer into the sleeve through the projecting portion and into adjacent relation to the bearing, and deforming the projecting portion inwardly into at least partially overlying relation to the adjacent side of the spacer to permanently retain the bearing and spacer within the sleeve.

5. A method in accordance with claim 4 wherein said step of deforming the projecting portion is effected by applying to the projecting portion a force which is directed axially of the bearing sleeve.

* * * * *